United States Patent [19]
Lew

[11] Patent Number: 4,777,830
[45] Date of Patent: Oct. 18, 1988

[54] FLOWMETER WITH PIVOTABLY FLOATING FLUID DYNAMIC TARGET

[76] Inventor: Hyok S. Lew, 7890 Oak St., Arvada, Colo. 80005

[21] Appl. No.: 22,027

[22] Filed: Mar. 5, 1987

[51] Int. Cl.$^4$ .............................................. G01F 1/28
[52] U.S. Cl. ................... 73/861.75; 73/861.71
[58] Field of Search ........... 73/861.71, 861.72, 861.74, 73/861.76, 215, 861.75

[56] References Cited

U.S. PATENT DOCUMENTS

| | | | |
|---|---|---|---|
| 1,407,060 | 2/1922 | Graemiger | 73/861.75 |
| 2,302,672 | 11/1942 | Buckley | 73/861.71 X |
| 2,857,762 | 10/1958 | Parshall et al. | 73/861.76 |
| 2,896,453 | 7/1959 | Ryan et al. | 73/861.75 |
| 2,917,922 | 12/1959 | Morse | 73/861.71 |
| 3,251,335 | 5/1966 | Dannevik | 73/861.75 X |
| 3,380,302 | 9/1968 | Gelinas | 73/861.75 |

FOREIGN PATENT DOCUMENTS

| | | | |
|---|---|---|---|
| 2614811 | 10/1977 | Fed. Rep. of Germany | 73/861.75 |
| 0034116 | 2/1984 | Japan | 73/861.76 |

*Primary Examiner*—Herbert Goldstein

[57] ABSTRACT

The flowmeter of the present invention comprises at least one combination of a rotatable member and at least one fluid dynamic target, wherein the fluid dynamic target is secured to the rotatable member in a pivoting relationship about a first axis generally perpendicular to the direction of the fluid flow, and the rotatable member is rotatably secured about a second axis off-set from and generally parallel to the first axis. The rotatable member is biased with a reaction torque about the second axis provided by the earth's gravitational force or by a mechanical spring that counter-acts the action torque generated by the fluid dynamic force on the fluid dynamic target. The magnitude of the angular displacement of the rotatable member from a reference position corresponding the the zero fluid velocity is directly or remotely measured as a measure of the fluid flow.

19 Claims, 3 Drawing Sheets

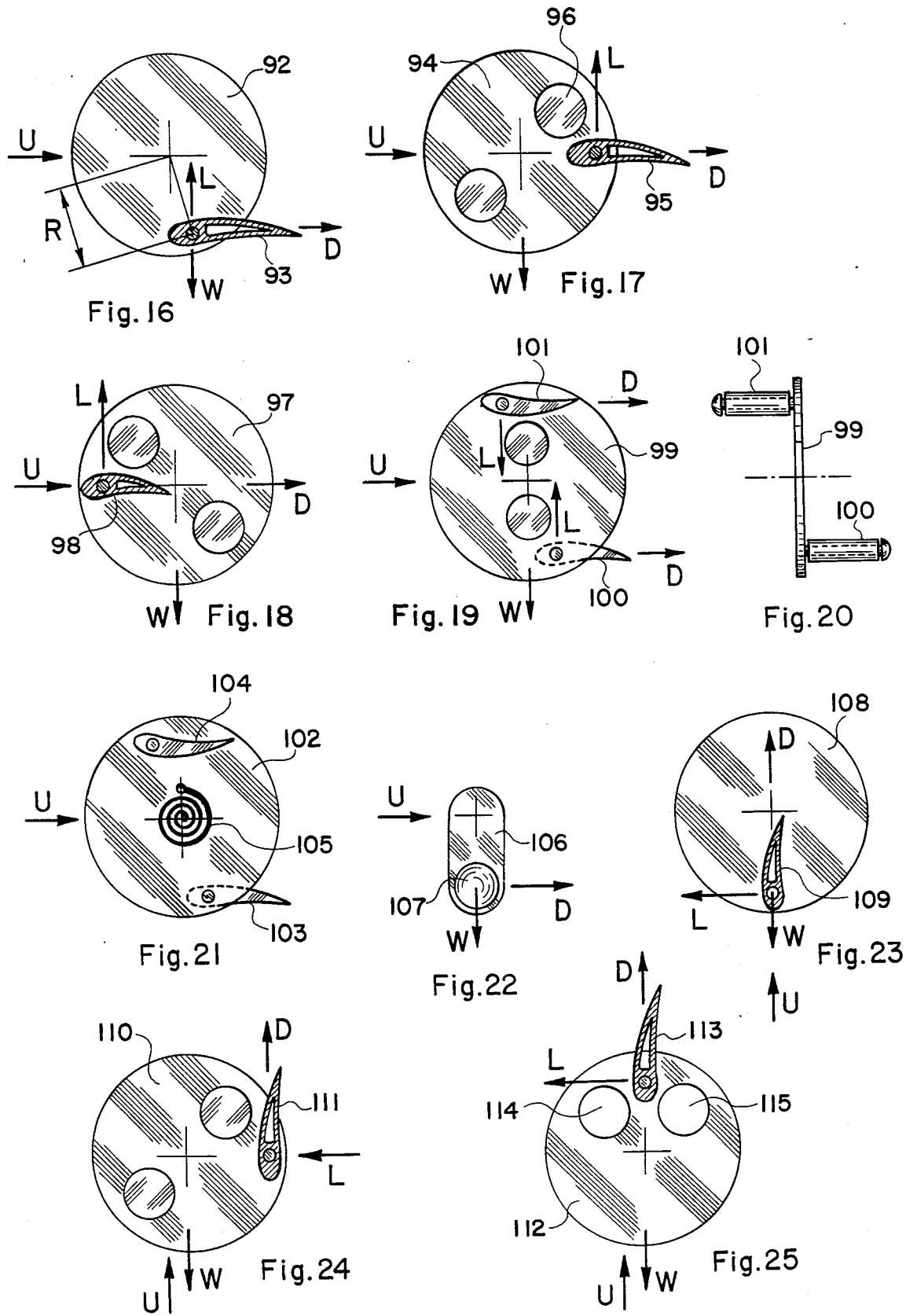

FLOWMETER WITH PIVOTABLY FLOATING FLUID DYNAMIC TARGET

BACKGROUND OF THE INVENTION

The necessity for measuring the rate of fluid flow in a wide range of velocities in the processing and manufacturing industries as well as in domestic energy managements has reached such a level that the significance of flow measuring and controlling technology in the processing industry is being compared to that of robotic technology in the manufacturing industry. The availability of accurate, wide ranging, and inexpensive flowmeters is crucially important for successful automations in the processing industry. The flowmeters with high accuracy available at the present time are expensive. Most flowmeters available at the present time suffer from insufficient velocity range as the ratio of the maximum velocity to the minimum velocity measurable with the present day flowmeters is limited to fifteen to one at best. Existing flowmeters are often incapable of measuring the low fluid flows in today's processing industries as the minimum velocities measurable with the existing flowmeters are not low enough.

BRIEF SUMMARY OF THE INVENTION

The primary object of the present invention is to provide a flowmeter for measuring mass flow rate or volumetric flow rate that comprises at least one combination of a rotatable member and at least one fluid dynamic target wherein the fluid dynamic target is secured to the rotatable member in a pivoting relationship about a first axis generally perpendicular to the direction of the fluid flow and the rotatable member is secured in a rotating relationship about a second axis generally parallel to the first axis.

Another object is to provide a flowmeter wherein the magnitude of the angular rotation of the rotatable member, which is generated by the torque thereon provided by the fluid dynamic target is directly or remotely measured as the rate of fluid flow.

A further object is to provide a flowmeter wherein the combination of the rotatable member and the fluid dynamic target includes bias torque counteracting the fluid dynamic torque, which bias torque is provided by the earth's gravitational pull on the combination unbalanced in mass about the second axis.

Yet another object is to provide a flowmeter wherein the combination of the rotatable member and the fluid dynamic target includes bias torque counteracting the fluid dynamic torque, which bias torque is provided by a mechanical spring.

Yet a further object is to provide a flowmeter which measures mass and volumetric flow rate for fluids with known densities; measures mass flow rate for fluids with unknown densities when it is installed in combination with a volumetric flowmeter; and measures volumetric flow rate for fluids with unknown densities when it is installed in combination with a mass flowmeter.

Still another object is to provide a flowmeter with a very high turn down ratio in the range of velocity measurement that is capable of measuring very low fluid velocities.

Still a further object is to provide a flowmeter that is inexpensive and whose design is compatible with small diameter as well as very large diameter tubes and pipes.

These and other objects of the present invention will become clear as the description thereof proceeds.

BRIEF DESCRIPTION OF FIGURES

The present invention may be described with a greater clarity and specificity by referring to the following figures:

FIG. 16 illustrates a combination of the rotatable member and the fluid dynamic target including a gravity biased counteracting torque which is for a flowmeter installed in a horizontal position.

FIG. 17 illustrates another combination of the rotatable member and the fluid dynamic target including a gravity biased counter-acting torque which is for a flowmeter installed in a horizontal position.

FIG. 18 illustrates a further combinaiton of the rotatable member and the fluid dynamic target including a gravity biased counter-acting torque, which is for a flowmeter installed in a horizontal position.

FIG. 19 illustrates yet another combination of the rotatable member and the fluid dynamic target including a gravity biased counter-acting torque, which is for a flowmeter installed in a horizontal position.

FIG. 20 illustrates an end view of the combination shown in FIG. 19.

FIG. 21 illustrates yet a further combination of the rotatable member and the fluid dynamic targets including a mechanical spring biased counter-acting torque, which is for flowmeter installed in any position.

FIG. 22 illustrates still another combination of the rotatable member and the fluid dynamic target including a gravity biased counter-acting torque, which is for a flowmeter installed in a horizontal position.

FIG. 23 illustrates still a further combination of the rotatable member and the fluid dynamic target including a gravity torque, which is for a flowmeter installed in a vertical position.

FIG. 24 illustrates yet still another combination of the rotating member and the fluid dynamic target including a gravity biased counter-acting torque, which is for flowmeter installed in a vertical position.

FIG. 25 illustrates yet still a further combination of the rotatable member and the fluid dynamic target including a gravity biased counter-acting torque, which is for a flowmeter installed in a vertical position.

DESCRIPTION OF THE ILLUSTRATED EMBODIMENT

Figure 1:
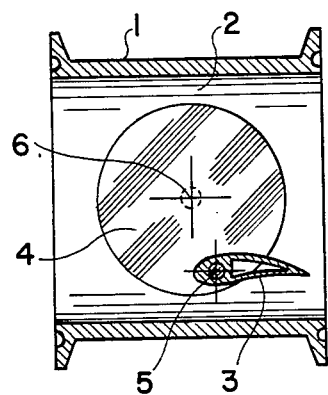
FIG. 1 illustrates a cross section of an embodiment of the flowmeter constructed in accordance with the principles of the present invention.
Figure 2:
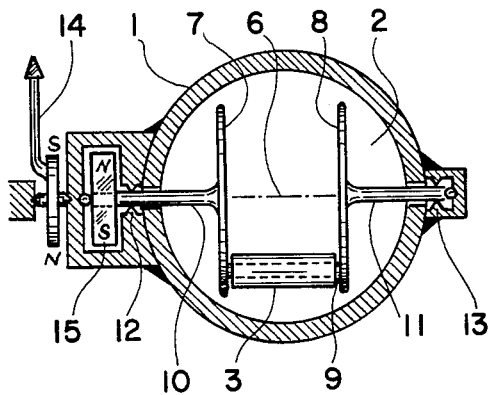
FIG. 2 illustrates another cross section of the embodiment shown in FIG. 1.
Figure 5:
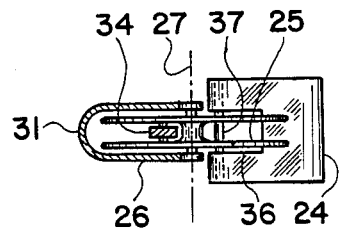
FIG. 5 illustrates a cross section of the embodiment shown in FIG. 4.

In FIG. 1 there is illustrated a cross section of an embodiment of the flowmeter constructed in accordance with the principles of the present invention, which cross section is taken along a plane including the central axis of the flow passage. The flowmeter comprises a flowmeter body 1 including a flow passage 2 extending from one extremity to the other extremity of the flowmeter body 1 and a combination of a fluid dynamic target 3 and a rotatable member 4. The fluid dynamic target 3 is secured to the rotatable member 4 in a pivoting relationship about a first axis 5 generally perpendicular to the direction of the fluid flow. The rotatable member 4 with a configuration having a small resistance or blockage against the fluid flow moving in a direction parallel to the central axis of the flow passage is secured to the flowmeter body 1 in a rotating relationship about a second axis 6 generally offset from and parallel to the first axis 5. The second axis 6 generally perpendicular to the central axis of the flow passage 2 may intersect the central axis of the flow passage 2 or may be disposed offset therefrom. The fluid dynamic target 3 is pivotably secured to the rotatable member 4 in such a way that the first axis 5 generally coincides with the center of gravity of the fluid dynamic target and the fluid dynamic moments about the first axis respectively created by the lift and drag force of the fluid dynamic target 3 cancel one another, whereby, the fluid dynamic target 3 maintains a generally constant angle of attack with respect to the direction of the fluid flow independent of the angle of rotation of the rotatable member 4. The rotatable member 4 may comprise a single or plurality of thin circular discs pivotably supporting a fluid dynamic target in an arrangement as shown in FIG. 2 or in an arrangement as shown in FIG. 5. It should be mentioned that the rotatable member 4 may include a simple pivoting arm extending from the second axis to the first axis in place of the circular disc shown in the illustrated embodiment.

In FIG. 2 there is illustrated another cross section of the embodiment of flowmeter shown in FIG. 1, which cross section is taken along plane perpendicular to the central axis of the flow passage. The rotatable member 4 includes a pair of thin circular discs 7 and 8 connected to one another by a spindle 9 that pivotably supports the fluid dynamic target 3. The combination of the two discs 7 and 8, and the fluid dynamic target 3 disposed in the middle of a cross section of the flow passage 2 includes a pair of journals 10 and 11 respectively extending in two opposite directions therefrom and rotatably supported by a pair of bearings 12 and 13 affixed to the flowmeter body 1, respectively. The angular movement or position of the fluid dynamic target 3 about the second axis 6 is transmitted to an indicator or display means such as an indicator needle 14 across the solid wall separating the fluid passage 2 from the ambient environment by means of a magnetic coupling including a magnet 15 affixed to a journal 10 or by other coupling or transducer emans. It should be mentioned that the two discs 7 and 8 pivotably supporting the fluid dynamic target 3 may be connected to one another by additional cross members such as the extension of the journals 10 and 11 that extends through the two discs 7 and 8 and connects the two journals to one another. It should be understood that the rotatable member 4 may include a single circular disc or simple pivoting arm supported by the two journals 10 and 11 that pivotably supports a fluid dynamic target straddling the single circular disc or the pivoting arm in an arrangement as shown in FIG. 5.

The flowmeter illustrated in and described in conjunction with FIGS. 1 and 2 operates on the following principles: The lift and drag force of the fluid dynamic target 3 proportional to the square of the fluid velocity rotates the rotatable member 4 against the counter-acting torque resulting from the unbalanced weight of the elements rotating about the second axis 6. When the two discs 7 and 8, the magnet 15 and the indicator needle 14 are balanced about the second axis 6, the only unbalanced weight is the weight of the fluid dynamic target 3. It can be easily shown that the condition of equilibrium of the moment about the second axis 6 yields equation $$\rho U^2 = \frac{2W}{C_L + C_D \cot\theta}, \quad 0 \leq \theta < 180°, \tag{1}$$

where $\rho$ is the fluid density, U is the fluid velocity, $C_L$ and $C_D$ are the lift and drag coefficients of the fluid dynamic target 3, W is the weight of the fluid dynamic target 3, and $\theta$ is the angle of rotation of the rotatable member 4 produced by the fluid flow. Of course, this relationship is valid only for a flowmeter installed in a horizontal position. The construction of flowmeters installed in positions other than the horizontal position will be discussed in conjunction with FIGS. 21–25. Since the lift and drag coefficients $C_L$ and $C_D$ as well the effective unbalanced weight W, which is the unbalanced weight existing at the first axis 5, of the fluid dynamic target 3 are constant and known quantities, the fluid velocity U can be determined from equation (1) for fluids of known densities, when the angle of rotation $\theta$ is measured. If the density of the fluid is unknown, the mass flow $\rho U$ can be determined from equation (1), when U is measured by a volumetric flowmeter installed in tandem with the flowmeter of the present invention; or the fluid velocity U can be determined from equation (1), when the mass flow $\rho U$ is measured by a mass flowmeter installed in tandem with the flowmeter of the present invention. It is readily noticed in equation (1) that the sensitivity of the flow measurement, as defined by the derivative of the fluid velocity U with respect to the angle of rotation $\theta$ is high in the low velocity range and low in the high velocity range. As a consequence, the flowmeter of the present invention is ideal for measuring fluid velocities ranging from very low values to very high values. It is easily recognized from equation (1) that the angle of rotation $\theta$ varies from zero to 180 degrees when the fluid velocity U changes from zero to infinity, when the lift coefficient $C_L$ is significantly greater than the drag coefficient $C_D$ of the fluid dynamic target 3. It should be understood that a fluid dynamic target of nonlifting geometry such as a sphere, cylinder or symmetric airfoil with zero angle of attack may be employed in place of the fluid dynamic target with a lifting geometry as employed in the illustrated embodiment shown in FIGS. 1 and 2. When a fluid dynamic target of nonlifting geometry is employed, the angle of rotation $\theta$ varies from zero to 90 degrees when the fluid velocity U changes from zero to infinity.

Figure 3:
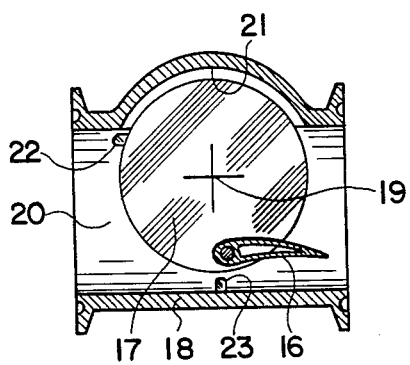
FIG. 3 illustrates another embodiment of the flowmeter of the present invention.

In FIG. 3 there is illustrated another embodiment of the flowmeter of the present invention constructed in essentially the same manner and operating on essentially the same principles as that shown in FIGS. 1 and 2, which embodiment is particularly suitable for the construction of flowmeters of small diameters. The combination of the fluid dynamic target 16 and the rotatable member 17 arranged in essentially the same way as that described in conjunction with FIGS. 1 and 2 is secured to the flowmeter body 18 in a rotating relationship about an axis 19 significantly off-set from the central axis of the fluid passage 20. The circular disc of the rotatable member 17 has a diameter sizably greater than the diameter of the flow passage, which circular disc is partially housed in a cavity 21 included in the flowmeter body 18. A pair of stops 22 and 23 set the zero angle of rotation corresponding to zero fluid velocity and the maximum angle of rotation corresponding to the maximum fluid velocity measurable with the flowmeter.

Figure 4:
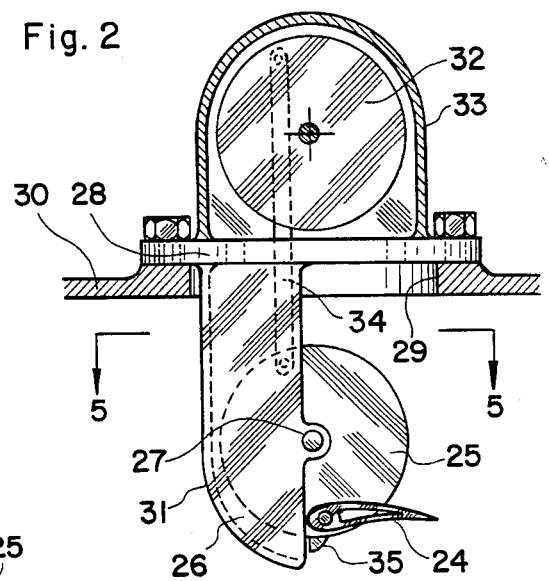
FIG. 4 illustrates a further embodiment of the flowmeter of the present invention.

In FIG. 4 there is illustrated a further embodiment of the flowmeter of the present invention, which embodiment is particularly suited for the construction of the insertion type flowmeter in contrast to the in-line type flowmeter shown in FIGS. 1 and 3. The combination of the fluid dynamic target 24 and the rotatable member 25 operating on the same principles as the corresponding combination described in conjunction with FIGS. 1 and 2 is secured to one extremity of the elongated support 26 in a rotating relationship about an axis 27. The elongated support 26 extending from an anchoring flange 28 extends through an opening 29 included in the pipe wall 30 and into the fluid passage. In general, it is a good practice to employ the elongated support 26 of substantially flat construction with a round leading edge 31, which has a deep and narrow groove that houses a sizable portion of the rotatable member 25. The rotating motion or angular position of the rotatable member 25 is transmitted to another rotatable member 32 rotatably secured to the sealed housing 33 extending from the anchoring flange 28 in a direction opposite to the elongated support 26 by means of a transmission coupling such as a connecting rod 34 that couples the rotating motion of the two rotatable members 25 and 32 to one another. The angular position of the rotatable member 32 is detected and measured as a measure of the fluid flow by sensing means such as those illustrated in FIG. 2, 6, 7, 8 and 9, respectively. Of course, a transducer or encorder may be installed directly in conjunction with the rotatable member 25 to measure the angular position of the fluid dynamic target 24 as a measure of the fluid flow. Such an arrangement of the angular position sensing device eliminates the necessity of the second rotatable member 32 and the motion coupling means 34. A stop 35 may be included in the rotatable member 25 that sets the zero degree position corresponding to zero fluid velocity. The extremity of the elongated support 31 may terminate in the midstream of the fluid or extend all the way across the flow passage and be secured to the pipe wall opposite to the opening 29 through the pipe wall.

In FIG. 5 there is illustrated a cross section of the embodiment of the flowmeter shown in FIG. 4, which cross section is taken along plane 5—5 as shown in FIG. 4. The fluid dynamic target 24 includes a slotted cutout 36 disposed at the midsection thereof, which is engaged by the rim of the rotatable member 25, wherein the fluid dynamic target 24 is pivotably supported by a shaft 37 extending from both sides of the rotatable member 25 and secured thereto. The rotatable member 25 may include a pair of discs sandwiching the motion coupling rod 34 therebetween in a spaced relationship as shown in the illustrated embodiment, or it may include a single disc as an obvious design alternative.

Figure 6:
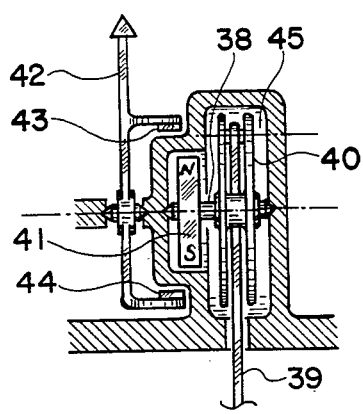
FIG. 6 illustrates an embodiment for directly reading the angular rotation of the rotatable member supporting the fluid dynamic target.

In FIG. 6 there is illustrated an embodiment for directly reading the angular position of the rotatable member supporting the fluid dynamic target. The rotating motion of the rotatable member such as the element 25 of FIG. 4 is transmitted to the output shaft 38 by a transmission means such as a motion coupling comprising the connecting rod 39 and the rotary member 40, which combination operates on the principles described in conjunction with FIG. 4. The output shaft 38 includes a bar magnet 41 nonrotatably affixed thereto. The indicator needle 42 rotatable about the same axis as that of the output shaft 38 and balanced in mass thereabout includes one or more magnetic couplers 43 and 44 disposed in a close proximity to the bar magnet 41. The magnetic coupling comprising the bar magnet 41 disposed within the cavity 45 open to the flow passage and the magnetic couplers 43 and 44 outside the cavity 45 transmits the rotating motion of the rotatable member supporting the fluid dynamic target, whereby the indicator needle 42 indicates the angular position of the fluid dynamic target about the axis of rotation of the rotatable member as a measure of the fluid flow.

Figure 7:
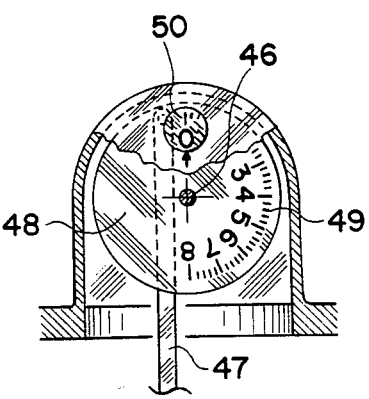
FIG. 7 illustrates another embodiment for directly reading the angular rotation of the rotatable member supporting the fluid dynamic target.

In FIG. 7 there is illustrated another embodiment for directly reading the angular position of the fluid dynamic target. The output axis 46 rotationally coupled to the rotatable member supporting the fluid dynamic target by a connecting rod 47 or other linkage means includes a disc with dials or scales 49. The wall of the cavity housing the combination of the output shaft 46 and the disc 48 with scales 49 includes a window 50, through which the scales 49 are displayed as a measure of the fluid flow.

Figure 8:
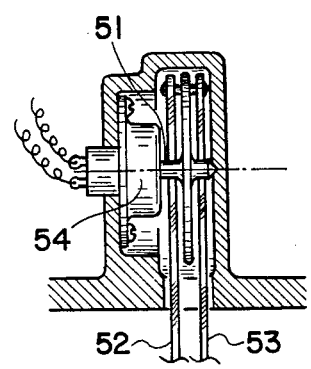
FIG. 8 illustrates an embodiment for remotely reading the angular rotation of the rotatable member supporting the fluid dynamic target.

In FIG. 8 there is illustrated an embodiment for remotely reading the angular position of the fluid dynamic target. The rotation of the output shaft 51 linked to the rotatable member supporting the fluid dynamic target by a pair of parallel connecting rods 52 and 53 is detected by an angular position transducer or encoder that puts out electrical signals indicating the exact angular position of the fluid dynamic target as a measure of the fluid flow.

Figure 9:
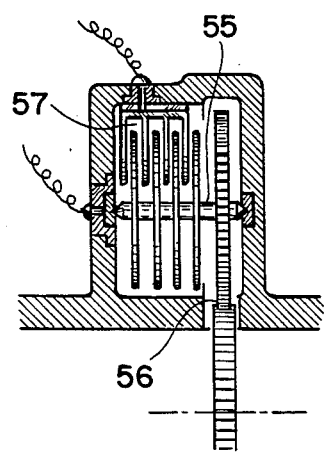
FIG. 9 illustrates another embodiment for remotely reading the angular rotation of the rotatable member supporting the fluid dynamic target.

In FIG. 9 there is illustrated another embodiment of remotely reading the angular position of the fluid dynamic target. The output shaft 55 linked to the orbiting motion of the fluid dynamic target by gearing 56 includes a variable capacitor 57, wherein the exact angular position of the fluid dynamic target is detected by measuring the capacitance of the variable capacitor 57 as a measure of the fluid flow.

Figure 10:
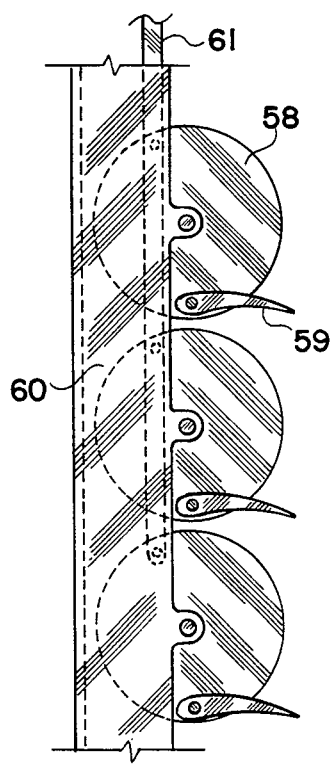
FIG. 10 illustrates an embodiment of the flowmeter of the present invention comprising a plurality of combinations of the rotatable member and the fluid dynamic target.

In FIG. 10 there is illustrated an embodiment of the insertion type flowmeter constructed in accordance with the principles of the present invention, which comprises a plurality of the combinations of a rotatable member and a fluid dynamic target 59 disposed along the length of the elongated support, which are assembled in the same arrangement as that illustrated in and described in conjunction with FIGS. 4 and 5. The plurality of the rotatable members are kinematically coupled to the output shaft such as those elements 38, 46, 51 and 55 respectively shown in FIGS. 6, 7, 8 and 9 by a common coupling means such as the connecting rod 61. The elongated support 60 including a plurality of the combinations of a rotatable member and a fluid dynamic target may extend across a cross section of the flow passage partially in a cantilever arrangement or entirely in a simple beam arrangement wherein the two extremities there of are supported by the pipe wall at two diametrically opposite positions. The insertion type flowmeter of the embodiment illustrated in FIG. 10 provides an advantage in that it is capable of measuring fluid flow averaged over the entire cross section of the flow passage.

Figure 11:
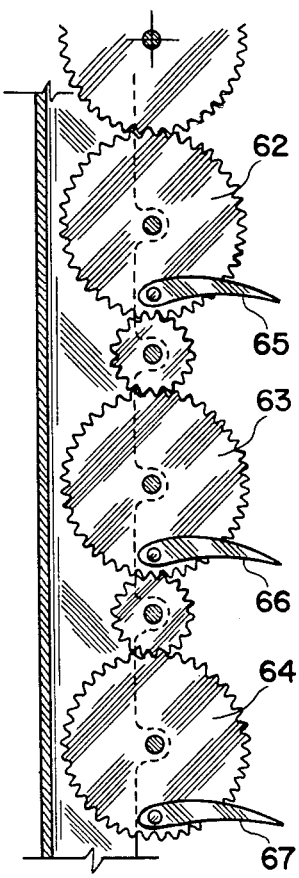
FIG. 11 illustrates another embodiment of the flowmeter of the present invention comprising a plurality of combinations of the rotatable member and the fluid dynamic target.

In FIG. 11 there is illustrated another embodiment of insertion type averaging flowmeter operating on the same principles as that show in FIG. 10. In this embodiment, the rotating motions of the plurality of the rotatable members 62, 63, 64, etc., respectively supporting fluid dynamic targets 65, 66, 67, etc. are coupled to each other and transmitted to the output shaft by gearing instead of a connecting rod. It should be noticed that the gear teeth are included in the rim of the discs of the rotatable members supporting the fluid dynamic targets.

Figure 12:
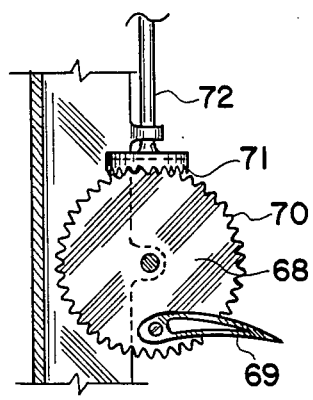
FIG. 12 illustrates an embodiment for transmitting the angular rotation of the rotatable member supporting the fluid dynamic target to the readout means such as those illustrated in FIGS. 6-9.

In FIG. 12 there is illustrated an embodiment for transmitting the angular rotation of the rotatable member supporting the fluid dynamic target to the readout or display means such as those combinations illustrated in FIGS. 6-9. The rotatable member 68 supporting the fluid dynamic target 69 includes gear teeth 70 included in the rim thereof, which gear teeth engage the gear 71 in a miter gear arrangement; wherein the rotation of the rotatable member 68 is transmitted to an output shaft 72 disposed perpendicular to the axis of rotation of the rotatable member 68. The rotation of the output shaft 72 may be converted to the readout or display means such as those illustrated in FIGS. 6-9.

Figure 13:
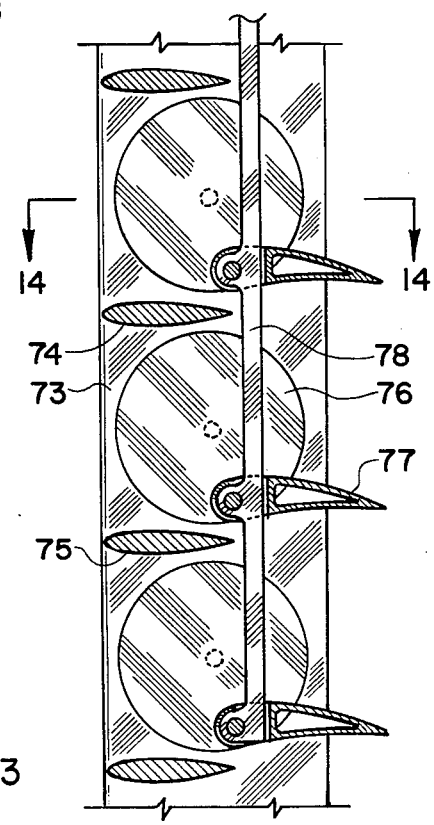
FIG. 13 illustrates a further embodiment of the flowmeter of the present invention including a plurality of combinations of the rotatable member and the fluid dynamic target.

In FIG. 13 there is illustrated a further embodiment of the flowmeter including a plurality of combinations of the rotatable member and the fluid dynamic target, wherein the individual combination of the rotatable member and the fluid dynamic target is arranged in a combination similar to that illustrated in FIG. 2, that contrasts the arrangements included in the embodiments of the flowmeter shown in FIGS. 10 and 11 which employ the arrangement shown in FIG. 5. The elongated support member includes a pair of generally flat elongated members which are connected to one another by a plurality of cross members 74, 75, etc. having a stream lined cross section, which cross members are disposed at regular intervals following the length of the elongated support 73. Each of the pluralities of combinations of the rotatable member 76 and the fluid dynamic target 77 arranged in a construction similar to that shown in FIG. 2 is disposed intermediate the two flat elongated members included in the elongated support 73 between each pair of the cross members 74, 75, etc. The rotations of the plurality of the rotatable members are transmitted to an output shaft by a common connecting rod 78.

Figure 14:
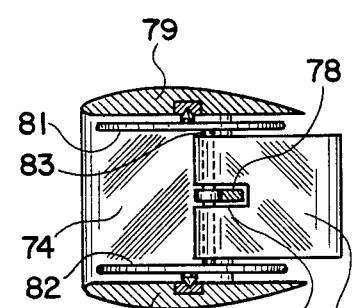
FIG. 14 illustrates a cross section of the embodiment shown in FIG. 13.

In FIG. 14 there is illustrated a cross section of the embodiment shown in FIG. 13, which cross section is taken along plane 14—14 as shwon in FIG. 13. The pair of flat elongated members 79 and 80 constituting the elongated support 73 are tied to one another by the cross members 74, 75, etc. The rotatable member 76 comprises a combination of a pair of thin discs 81 and 82 connected to one another by the shaft 83 affixed thereto in an eccentric arrangement, which supports the fluid dynamic target 77 disposed intermediate the two thin discs 81 and 82 in a pivoting relationship, wherein the combination of the two discs 81 and 82 is secured to the two flat elongated members 79 and 80 in a rotating relationship about the central axis thereof. The common connecting rod 78 rotatably engaged by the shaft 83 is routed through a slotted cutout 84 included in the leading edge of the fluid dynamic target 77 at the midsection thereof. It should be mentioned that the rotation of the rotatable members included in the embodiment shown in FIGS. 13 and 14 may be transmitted to an output shaft such as those illustrated in FIGS. 6-9 by other motion transmission means such as those shown in FIGS. 10, 11 and 12 instead of the particular arrangement including the common connecting rod 78 as shown in FIGS. 13 and 14.

Figure 15:
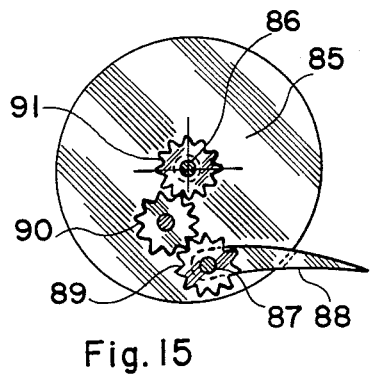
FIG. 15 illustrates an embodiment for maintaining the constant angle of attack of the fluid dynamic target independent of the rotation of the rotatable member supporting the fluid dynamic target.

In FIG. 15 there is illustrated an embodiment for maintaining the fluid dynamic target at a constant angle of attack independent of the orbiting motion thereof about the axis of rotation of the rotatable member. The rotatable member rotatably supported by the shaft 86 includes a journal 87 that pivotably supports the fluid dynamic target 88. A gear 89 affixed to the fluid dynamic target in a coaxial relationship about the journal 87 engages an idler gear 90 rotatably secured to the rotatable member 85, which idler gear 90 engages a stationary gear nonrotatably affixed to the elongated support in a coaxial relationship about the shaft 86. The gears 89 and 91 have the same pitch diameter, and consequently, the angle of attack of the fluid dynamic target 88 remains constant independent of the orbiting motion thereof about the shaft 86. The embodiment shown in FIG. 15 shows an active means for maintaining the constant angle of attack of the fluid dynamic target. It should be mentioned that the angle of attack of the fluid dynamic targets included in the embodiments shown in FIGS. 1, 3, 4, 10, 11, 12 and 13 is maintained at a generally constant value by a passive means wherein the fluid dynamic force on the fluid dynamic target balanced in mass about the pivoting axis thereof maintains the angle of attack at a generally constant value independent of the orbiting motion of the fluid dynamic target about the axis of rotation of the rotatable member. Of course, an active means for maintaining the constant angle of attack such as that shown in FIG. 15 may be incorporated into the embodiments shown in FIGS. 1, 3, 4, 10, 11, 12 and 13 instead of the passive means included therein.

In FIG. 16 there is illustrated a combination of the rotatable member 92 and the fluid dynamic target 93, which includes a gravity based counter-acting torque provided by the weight of the fluid dynamic target. In this combination for a flowmeter installed in a horizontal position, the fluid dynamic target 93 comes to rest at the 6 o'clock position when there is no fluid flow. The 6 o'clock position is defined in such a way that the earth's gravitational pull acts in a direction from the 12 o'clock position to the 6o'clock position. The dynamic pressure of the fluid flow is related to the angle of rotation $\theta$ of the rotatable member measured from the 6o'-clock position by equation $$\tfrac{1}{2}\rho U^2 = \frac{CW}{C_L + C_D \cot\theta}, \; 0 \leq \theta < 180°, \quad (2)$$

where $\rho$ and U are respectively the density and velocity of the fluid, $C_L$ and $C_D$ are respectively the lift and drag coefficients of the fluid dynamic target, C is a constant of proportionality, and W is the counter weight provided the gravity biased counter-acting torque. By using a scale or an electronic data processor executing an algorithm defined by equation (2), the fluid velocity U or mass flow $\rho U$ can be determined from the measured value of $\theta$.

In FIG. 17 there is illustrated another combination of the rotatable member 94 and the fluid dynamic target 95 including a gravity biased counter-acting torque, which combination is for a flowmeter installed in a horizontal position, wherein the counter weight W is provided by the combination of the light weight plug 95 and the heavy weight plug included in the rotatable member 94. In general, it is a good practice to employ a geometrically axisymmetric rotatable member 94 that includes a counter weight built thereinto as exemplified by the embodiment shown in FIG. 17, which practice ensures the consistent fluid dynamic characteristics of the fluid target independent of the angular position of the fluid dynamic target about the axis of rotation of the rotatable member 94. In this particular embodiment, the counter weight W is incorporated in such a way that the fluid dynamic target comes to rest at the 3o'clock position when there is no flow of the fluid. The dynamic pressure of the fluid is related to the angle of rotation $\theta$ of the rotatable member measured from the 3o'clock position by the equation $$\tfrac{1}{2}\rho U^2 = \frac{CW}{C_L \cot\theta - C_D}, \; 0 \leq \theta < 90°, \quad (3)$$

It is noticed from equations (2) and (3) that the embodiment shown in FIG. 16 has a range twice greater than that of the embodiment shown in FIG. 17.

In FIG. 18 there is illustrated a further combination of the rotatable member 97 and the fluid dynamic target 98 including a gravity biased counter-acting torque provided by the counter weight W, which is for a flowmeter installed in a horizontal position, wherein the fluid dynamic target 98 comes to rest at the 9 o'clock position when there is no flow of the fluid. The dynamic pressure of the fluid flow is related to the angle of rotation $\theta$ of the rotatable member measured from the 9o'-clock position by equation $$\tfrac{1}{2}\rho U^2 = \frac{CW}{C_L \cot\theta + C_D}, \; 0 \leq \theta < 90°, \quad (4)$$

In FIG. 19 there is illustrated yet another combination of the rotatable member 99 and two fluid dynamic targets 100 and 101 disposed at two diametrically opposite locations about the axis of rotation of the rotatable member that includes a gravity biased counter-acting torque provided by the counter weight W, which is for a flowmeter installed in a horizontal position, wherein the two fluid dynamic targets 100 and 101 respectively come to rest at 6 and 12 o'clock positions when there is no flow of the fluid. The dynamic pressure of the fluid flow is related to the angle of rotation $\theta$ of the rotatable member measured from the 6o'clock position by equation $$\tfrac{1}{2}\rho U^2 = \frac{2CW}{C_L}, \; 0 \leq \theta < 180°, \quad (5)$$

In FIG. 20 there is illustrated an end view of the combination shown in FIG. 19. In order to prevent fluid dynamic interference between the two fluid dynamic targets 100 and 101, the two fluid dynamic targets are respectively disposed at two opposing sides of the rotatable member 99.

In FIG. 21 there is illustrated yet a further combination of the rotatable member 102 and two fluid dynamic targets 103 and 104 arranged in essentially the same combination as that shown in FIGS. 19 and 20 with one exception being that the counter-acting torque is now provided by a mechanical spiral spring 105 in place of the counter weight. The flowmeter employing this combination of the rotatable member and the fluid dynamic targets can be installed in horizontal or vertical or any other position. The dynamic pressure of the fluid flow is related to the angle of rotation $\theta$ of the rotatable member measured from the 6o'clock zero velocity position by equation $$\tfrac{1}{2}\rho U^2 = \frac{Ck\theta}{C_L \sin\theta}, \; 0 \leq \theta < 180°, \quad (6)$$

where k is the spring coefficient. It should be mentioned that in the embodiments shown in FIGS. 1 through 20 may employ a mechanical spring biased counter-acting torque instead of the gravity biased counter-acting torque. When the mechanical spring biased counter-acting torque means is employed in place of the gravity biased counter-acting torque means, the counter weight W appearing in the equations relating the dynamic pressure to the angle of rotation $\theta$ of the rotatable element has to be substituted with $k\theta/\sin\theta$ where k is the spring coefficient of the mechanical spring. The flowmeter with mechanical spring biased counter-acting torque means can be installed in a horizontal, vertical, or any other positions.

In FIG. 22 there is illustrated still another combination of the rotatable member 106 and the fluid dynamic target 107 that includes the gravity biased counter-acting torque means provide by the counter weight W. The fluid dynamic target 107 comprises a pair of hemispherical boss affixed to the two opposing sides of the rotating member 106 that is a simple rotating arm of a flat construction instead of a circular disc. The fluid dynamic target 107 has zero lifting coefficient. The equation relating the dynamic pressure to the angle of rotation $\theta$ of the rotatable member 106 can be obtained from equation (2) by substituting $C_L$ with zero, which yields equation $$\tfrac{1}{2}\rho U^2 = \frac{CW}{C_D} \tan\theta, \; 0 \leq \theta < 90°, \quad (7)$$

In FIG. 23 there is illustrated still a further combination of the rotatable member 108 and the fluid dynamic target 109 including a gravity biased counter-acting torque means, which is for a flowmeter installed in a vertical position. The dynamic pressure of the fluid flow is related to the angle of rotation θ of the rotatable member measured from the 6o'clock position by equation $$\tfrac{1}{2}\rho U^2 = \frac{CW}{C_L\cot\theta + C_D}, 0 \leq \theta < 90°, \qquad (8)$$

In FIG. 24 there is illustrated yet still another combination of the rotatable member 110 and the fluid dynamic target 111 including a gravity biased counter-acting torque means, which is for a flowmeter installed in a vertical position. The dynamic pressure of the fluid flow is related to the angle of rotation θ of the rotatable member measured from 3o'clock position by equation $$\tfrac{1}{2}\rho U^2 = \frac{CW}{C_L + C_D\cot\theta}, 0 \leq \theta < 180°, \qquad (9)$$

In FIG. 25 there is illustrated yet still a further combination of the rotatable member 112 and the fluid dynamic target 113 including a gravity biased counter-acting torque means, which is for flowmeter installed in a vertical position. The counter weight for the gravity biased counter-acting torque means is provided by blanking out portions 114 and 115 of the rotatable member 121, which method for providing counter weight is inferior in flowmeter performance, but simpler in construction compared with the method employing a pair of plugs of different weights as shown in FIGS. 17, 19 and 24. The dynamic pressure of the fluid flow is related to the angle of rotation θ of the rotatable member measured from 12 o'clock position by equation $$\tfrac{1}{2}\rho U^2 = \frac{CW}{C_L\cot\theta - C_D}, 0 \leq \theta < 90°, \qquad (10)$$

Of course, the combinations shwon in FIGS. 22, 23, 24 and 25 may employ mechanical spring biased counter-acting torque means instead of the gravity biased counter-acting torque means.

While the principles of the present invention have now been made clear by the illustrative embodiments, it will be immediately obvious to the skilled in the art many modifications of the structures, arrangements, proportions, elements and materials which are particularly adapted to the specific working environments and operating conditions in the practice of the invention without departing from those principles.

I claim:

1. An apparatus for measuring fluid flow comprising in combination:
    (a) a body including a flow passage extending from one extremity to the other extremity of said body;
    (b) at least one supporting member disposed within the flow passage rotatably about a first axis disposed across a cross section of the flow passage generally perpendiclar to the central axis of the flow passage, wherein the supporting member has an axisymmetric construction about said first axis whereby the fluid dynamic force on the supporting member does not generate a torque about said first axis;
    (c) at least one lift force generating fluid dynamic target having a streamlined cross section taken along a plane perpendicular to said first axis, said fluid dynamic target secured to the supporting member pivotably about a second axis off-set from and generally parallel to said first axis, and passing through said streamlined cross section of the fluid dynamic target, wherein the fluid dynamic target is substantially separated from the wall of said flow passage at all angular positions about said first axis;
    (d) means for counter-acting torque on the combination of said support and fluid dynamic target about said first axis resulting from fluid dynamic force on the fluid dynamic target, said means returning the combination of said support and fluid dynamic target to a first angular position about said first axis corresponding to zero fluid velocity in the absence of the fluid dynamic force; and
    (e) means for measuring the angle of rotation of the supporting member about said first axis from said first angular position as a measure of fluid flow through said flow passage, wherein the maximum angle of rotation is generally close to 180 degrees.

2. The combination as set forth in claim 1 wherein said means for counter-acting the torque resulting from the fluid dynamic force comprises unbalanced mass distribution of the combination of the supporting member and the fluid dynamic target about said first axis, which unbalanced mass distribution produces a torque abut said first axis from the earth's gravitational force.

3. The combination as set forth in claim 2 wherein the fluid dynamic target has a generally balanced mass distribution about said second axis wherein the fluid dynamic force on the fluid dynamic target maintains a generally constant angle of attack of the fluid dynamic target independent of the rotation of the supporting member about said first axis.

4. The combination as set forth in claim 2 wherein said combination includes a mechanical means for maintaining the angle of attack of the fluid dynamic target at a generally constant value independent of the rotation of said supporting member about said first axis.

5. The combination as set forth in claim 4 wherein said mechanical means comprises a first gear nonrotatably disposed in a coaxial relationship to said first axis, a second gear affixed to said fluid dynamic target in a coaxial relationship to said second axis and an idler gear simultaneously engaging said first and second gears.

6. The combination as set forth in claim 1 wherein said means for counter-acting the torque resulting from the fluid dynamic force comprises a spring bias means producing a torque about said first axis in a direction opposite to the torque resulting from the fluid dynamic force.

7. The combination as set forth in claim 6 wherein the fluid dynamic target has a generally balanced mass distribution about said second axis wherein the fluid dynamcic force on the fluid dynamic target maintains a generally constant angle of attack of the fluid dynamic target independent of the rotation of the supporting member about said first axis.

8. The combination as set forth in claim 6 wherein said combination includes a mechanical means for maintaining the angle of attack of the fluid dynamic target at a generally constant value independent of the rotation of said supporting member about said first axis.

9. The combination as set forth in claim 8 wherein said mechanical means comprises a first gear nonrotatably disposed in a coaxial relationship to said first axis, a second gear affixed to said fluid dynamic target in a coaxial relationship to said second axis and an idler gear simultaneously engaging said first and second gears.

10. An apparatus for measuring fluid flow comprising in combinaiton:
(a) an elongated member for insertion into a flow passage including around upstream facing surface and two side surfaces forming a cavity, said elongated member disposed across a cross section of the flow passage;
(b) at least one planar supporting member disposed partially within said cavity and secured to said elongated member rotatably about a first axis disposed across said cavity generally perpendicular to the direction of the fluid flow, wherein the supporting member has an axisymmetric construction about said first axis whereby the fluid dynamic force on the supporting member does not generate a torque about said first axis;
(c) at least one lift force generating fluid dynamic target having a streamlined cross section taken along a plane perpendicular to said first axis, said fluid dynamic target secured to a portion of the supporting member located outside the cavity pivotably about a second axis off-set from and generally parallel to said first axis and passing through said streamlined cross section of the fluid dynamic target, wherein the fluid dynamic target is substantially separated from the wall of the flow passage at all angular positions about said first axis;
(d) means for counter-acting torque on the combination of said support and fluid dynamic target about said first axis resulting from fluid dynamic force on the fluid dynamic target, said means returning the combination of said support and fluid dynamic target to a first angular position about said first axis corresponding to zero fluid velocity in the absence of the fluid dynamic force; and
(e) means for measuring the angle of rotation of the supporting member about said first axis from said first angular position as a measure of fluid flow through said flow passage, wherein the maximum angle of rotation is generally close to 180 degrees.

11. The combination as set forth in claim 10 wherein said supporting member comprises a disc disposed parallel to the direction of the fluid flow, wherein approximately one half of the disc is located outside said cavity.

12. The combination as set forth in claim 11 wherein said means for counter-acting the torque resulting from the fluid dynamic force comprises unbalanced mass distribution of the combination of the supporting member and the fluid dynamic target about said first axis, which unbalanced mass distribution produces a torque about said first axis from the earth's gravitational force.

13. The combination as set forth in claim 12 wherein the fluid dynamic target has a generally balanced mass distribution about said second axis wherein the fluid dynamic force on the fluid dynamic target maintains a generally constant angle of attack of the fluid dynamic target independent of the rotation of the supporting member about said first axis.

14. The combination as set forth in claim 12 wherein said combination includes a mechanical means for maintaining the angle of attack of the fluid dynamic target at a generally constant value independent of the rotation of said supporting member about said first axis.

15. The combination as set forth in claim 14 wherein said mechanical means comprises a first gear nonrotatably disposed in a coaxial relationship to said first axis, a second gear affixed to said fluid dynamic target in a coaxial relationship to said second axis and an idler gear simultaneously engaging said first and second gears.

16. The combination as set forth in claim 11 wherein said means is counter-acting the torque resulting from the fluid dynamic force comprises a spring bias means producing a torque about said first axis in a direction opposite to the torque resulting from the fluid dynamic force.

17. The combination as set forth in claim 16 wherein the fluid dynamic target has a generally balanced mass distribution about said second axis wherein the fluid dynamic force on the fluid dynamic target maintains a generally constant angle of attack of the fluid dynamic target independent of the rotation of the supporting member about said first axis.

18. The combination as set forth in claim 16 wherein said combination includes a mechanical means for maintaining the angle of attack of the fluid dynamic target at a generally constant value independent of the rotation of said supporting member about said first axis.

19. The combination as set forth in claim 18 wherein said mechanical means comprises a first gear nonrotatably disposed in a coaxial relationship to said first axis, a second gear affixed to said fluid dynamic target in a coaxial relationship to said second axis and an idler gear simultaneously engaging said first and second gears.

* * * * *